(12) United States Patent
Kawaguchi et al.

(10) Patent No.: US 11,394,071 B2
(45) Date of Patent: Jul. 19, 2022

(54) BATTERY ASSEMBLY STRUCTURE

(71) Applicant: AISIN KEIKINZOKU CO., LTD., Imizu (JP)

(72) Inventors: Satoshi Kawaguchi, Takaoka (JP); Kosuke Kido, Toyama (JP)

(73) Assignee: AISIN KEIKINZOKU CO., LTD. (JP)

( * ) Notice: Subject to any disclaimer, the term of this patent is extended or adjusted under 35 U.S.C. 154(b) by 52 days.

(21) Appl. No.: 16/263,208

(22) Filed: Jan. 31, 2019

(65) Prior Publication Data
US 2019/0237725 A1    Aug. 1, 2019

(30) Foreign Application Priority Data

Feb. 1, 2018   (JP) .............................. JP2018-016075

(51) Int. Cl.
*H01M 50/20* (2021.01)
*B60K 1/04* (2019.01)

(52) U.S. Cl.
CPC ............... *H01M 50/20* (2021.01); *B60K 1/04* (2013.01); *H01M 2220/20* (2013.01)

(58) Field of Classification Search
CPC ........... H01M 2/10–183; H01M 50/20; H01M 2220/20; B60K 1/04
USPC .......................................................... 429/99
See application file for complete search history.

(56) References Cited

U.S. PATENT DOCUMENTS

| | | | |
|---|---|---|---|
| 2008/0280195 A1* | 11/2008 | Kumar | H01M 50/24 429/100 |
| 2009/0239136 A1* | 9/2009 | Nagamine | H01M 10/0481 429/148 |
| 2013/0183571 A1 | 7/2013 | Miyazaki et al. | |
| 2014/0113171 A1* | 4/2014 | Schaefer | H01M 10/625 429/120 |
| 2017/0305251 A1 | 10/2017 | Hara et al. | |
| 2018/0029493 A1 | 2/2018 | Kobayashi et al. | |
| 2018/0269441 A1 | 9/2018 | Yum et al. | |
| 2019/0237724 A1 | 8/2019 | Kawaguchi et al. | |

FOREIGN PATENT DOCUMENTS

| | | |
|---|---|---|
| CN | 107093781 A | 8/2017 |
| DE | 10-2016-009930 A1 | 2/2017 |
| JP | 2009170687 A * | 7/2009 |

(Continued)

OTHER PUBLICATIONS

Korean Patent Application English translation of KR 100709262 originally published to Tae-Yong Kim on Apr. 19, 2007 (Year: 2007).*

(Continued)

*Primary Examiner* — Cynthia H Kelly
*Assistant Examiner* — Niara Trant
(74) *Attorney, Agent, or Firm* — Harness, Dickey & Pierce, P.L.C.

(57) ABSTRACT

Provided is a battery assembly structure including: a holding panel that holds a bottom part of a battery module; a pair of mounting brackets coupled to both ends of the holding panel and standing upright so as to face both end surfaces of the battery module; and an elastic member disposed between an inner surface of at least one of the pair of mounting brackets and at least one end surface of the end surfaces of the battery module.

5 Claims, 3 Drawing Sheets

(56) References Cited

FOREIGN PATENT DOCUMENTS

| JP | 2012-123917 A | | 6/2012 |
|---|---|---|---|
| JP | 2012160347 A | * | 8/2012 |
| KR | 100709262 B1 | * | 4/2007 |
| WO | 2012-043594 A1 | | 4/2012 |

OTHER PUBLICATIONS

EPO English machine translation of JP 2009170687, originally published to Horikoshi Ron on Jul. 30, 2009 (Year: 2009).*
EPO English machine translation of JP 2012160347, originally published to Kume Masao on Aug. 23, 2012 (Year: 2012).*
Notice of Reasons for Refusal for corresponding Japanese Application No. 2018-016075 dated Jan. 5, 2022, with English translation (6 Pages).

* cited by examiner

BATTERY ASSEMBLY STRUCTURE

The present application includes the contents of Japanese Patent Application No. 2018-016075 filed on Feb. 1, 2018. The entire disclosure of Japanese Patent Application No. 2018-016075 filed Feb. 1, 2018 is expressly incorporated herein by reference.

BACKGROUND

The present disclosure relates to a battery assembly structure for installing a battery, serving as a driving source, in a vehicle.

A secondary battery is used as a driving source in an electric vehicle, a hybrid vehicle, a plug-in hybrid vehicle, etc.

To extend the distance that a vehicle can run on a single charge, it is necessary to install a high-capacity secondary battery.

A secondary battery installed in a vehicle is used in the form of a battery module in which single cells are stacked.

A battery module is also called a battery pack, an assembled battery, etc.

A battery module has been hitherto mounted in a vehicle, for example, as illustrated in FIG. 3, by holding an assembled battery, in which single cells are stacked, with a fixing tool 101 and then fixing the assembled battery to a frame body 2 etc. by means of a bracket 102.

Thus, a vacant space S is created by the bracket 102, which puts a limit on saving the installation space of the battery module.

JP-A-2012-123917 discloses a structure in which a battery module is covered by an upper holder and a lower holder that is fixed to a tray, such that side walls of the upper holder overlap side walls of the lower holder, and the tray is fixed to a vehicle by brackets. However, again, a dead space is created due to the mounting space of the brackets.

DESCRIPTION OF EXEMPLARY EMBODIMENTS

Figure 1A:
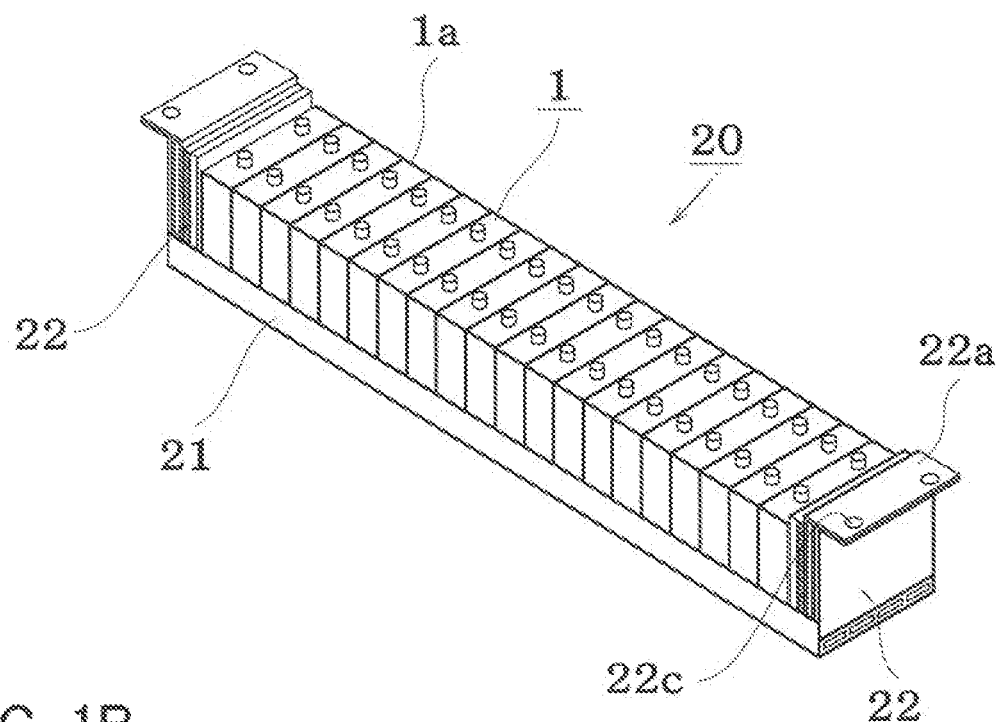
FIG. 1A illustrates an example of a battery assembly structure according to the disclosure.

The following disclosure provides many different embodiments, or examples, for implementing different features of the provided subject matter. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

An object of the disclosure is to provide a battery assembly structure that is compact and has high installation efficiency.

In accordance with one of some embodiments, there is provided a battery assembly structure, comprising:

a holding panel that holds a bottom part of a battery module;

a pair of mounting brackets coupled to both ends of the holding panel and standing upright so as to face both end surfaces of the battery module; and an elastic member disposed between an inner surface of at least one of the pair of mounting brackets and at least one end surface of the both end surfaces of the battery module.

Here, the purpose of providing the elastic member on the inner surface of at least one of the pair of mounting brackets is to press at least one end surface of the battery module by the elastic member so as to restrain the battery module in position. Elastic members may be provided respectively on the inner surfaces of both of the pair of mounting brackets.

In accordance with one of some embodiments, there is provided the battery assembly structure, wherein the elastic member may be held on the inner surface of the at least one of the pair of mounting brackets.

Holding the elastic members on the inner surfaces of the pair of mounting brackets improves the efficiency of the work of assembling the battery module between the pair of mounting brackets.

In accordance with one of some embodiments, the battery assembly structure may further comprise an elastic insertion material insertable between the elastic member and the at least one end surface of the battery module.

Thus, before the elastic insertion material is inserted between the elastic member and the end surface of the battery module, the battery module can be easily assembled between the pair of mounting brackets, and when the elastic insertion material is inserted after that, it also becomes easy to adjust the force with which the battery module is restrained.

In accordance with one of some embodiments, there is provided the battery assembly structure, wherein the holding panel may include a rectangular bottom panel having both side edges, and side edge portions standing upright at the side edges of the bottom panel along the side edges, and the bottom part of the battery module is held by being sandwiched between the side edge portions.

Thus, the both end surfaces of the battery module are restrained by the elastic members between the pair of mounting brackets, while the two side surfaces of the rectangular bottom part of the battery module are restrained between the side edge portions of the holding panel.

In accordance with one of some embodiments, there is provided the battery assembly structure, wherein:

the holding panel may be capable of holding the battery module in which single cells are stacked; and the single cells may be each held by being sandwiched between the side edge portions of the holding panel.

Thus, the stacked single cells can be each held by being sandwiched between the side edge portions of the holding panel.

In accordance with one of some embodiments, there is provided the battery assembly structure, wherein the mounting bracket may have a hollow sectional shape.

Thus, the strength of the mounting bracket against deformation is improved.

In accordance with one of some embodiments, there is provided the battery assembly structure, wherein the holding panel may have a hollow sectional shape.

Thus, the degree of protection of the battery module is enhanced, and moreover the hollow portion can be used to circulate a refrigerant to thereby cool the battery module.

As has been described above, in this battery assembly structure, the battery module can be assembled between the pair of mounting brackets so as to be restrained in position by the elastic members and the elastic insertion materials. Thus, the structure is made compact, and accordingly a higher capacity battery can be installed in a vehicle.

In the following, an example of the battery assembly structure according to the disclosure will be described based on the drawings, but the disclosure is not limited to this example.

Figure 1B:
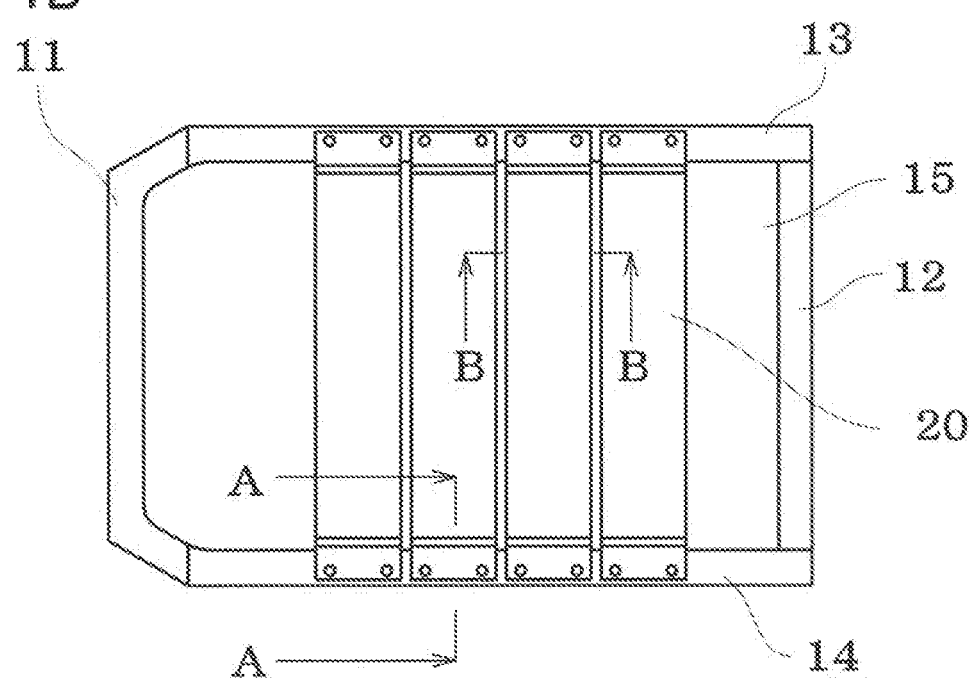
FIG. 1B illustrates an example in which the battery assembly structure is installed in a vehicle.

FIG. 1A illustrates an external view of a battery assembly structure 20, and FIG. 1B illustrates an example in which the battery assembly structure 20 is installed in a vehicle.

The battery assembly structure 20 includes a holding panel 21, and a pair of mounting brackets 22, 22 standing upright at ends in a longitudinal direction of the holding panel 21 and facing each other.

A battery module 1 in which single cells 1a are stacked is assembled so as to be sandwiched between the pair of mounting brackets 22, 22.

There is no limitation on the structure of the battery module 1 in the disclosure.

Figure 2A:
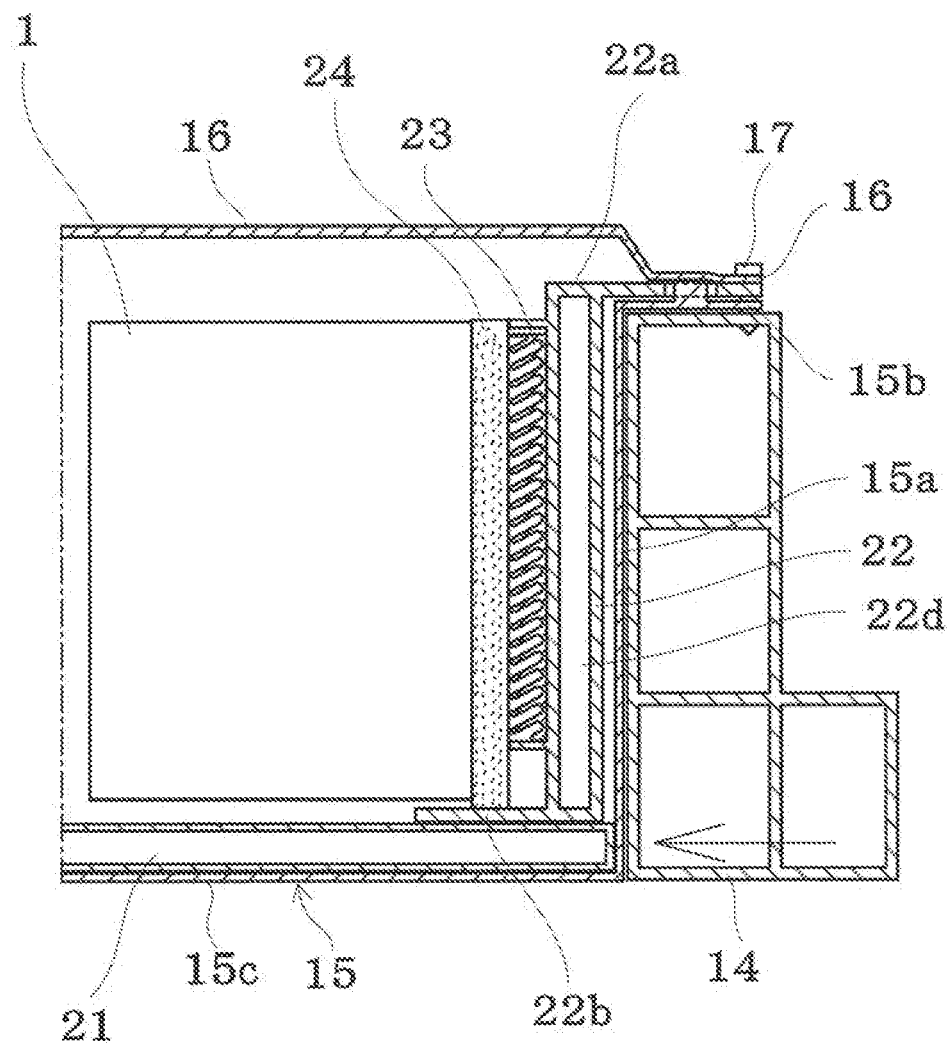
FIG. 2A illustrates a sectional view taken along line A-A of FIG. 1B.

FIG. 1B illustrates an example in which the battery assembly structures 20 are installed under a floor of a vehicle body, and FIG. 2A illustrates a sectional view taken along line A-A of FIG. 1B.

To install the battery assembly structure 20 in the vehicle, a front frame 11 and a rear frame 12 are fixed to the vehicle so as to face each other in a front-rear direction of the vehicle. In this example, ends on both sides of the front frame 11 and those of the rear frame 12 are coupled to side frames 13, 14 to thereby form a frame body, and this frame body is fixed to the vehicle. A case body 15 having a container shape is mounted on an inner side of the frame body.

The case body 15 includes a bottom 15c, side walls 15a standing upright at peripheral edges of the bottom 15c, and flanges 15b each formed so as to bend from an upper end of the side wall 15a toward an outer side in a longitudinal direction of the bottom 15c (the width direction of the vehicle). The flanges 15b are fastened and fixed to upper surfaces of the side frames 13, 14.

An example of the mounting bracket 22 of the battery assembly structure 20 in which the mounting bracket 22 has a hollow sectional shape with a hollow portion 22d is illustrated.

The mounting bracket 22 is coupled to an end of the holding panel 21 through a coupling portion 22b provided at a lower end of the mounting bracket 22. A mounting part 22a extended toward an outer side in a longitudinal direction of the holding panel 21 (the width direction of the vehicle) is provided at an upper end of the mounting bracket 22.

As illustrated in FIG. 1A, the mounting part 22a has mounting holes 22c. As illustrated in FIG. 2A, the mounting bracket 22 is fastened and fixed by fastening members 17, such as bolts, so as to sandwich the flange 15b of the case body 15 between the mounting part 22a of the mounting bracket 22 and an upper surface of a frame, such as the side frame 14.

As necessary, a cover 16 covering the battery module 1 from above may be mounted. The cover 16 can be fastened to the upper surfaces of the side frames 13, 14 by the fastening members 17.

Elastic members 23 that restrain ends of the battery module 1 in position are provided on inner sides of the pair of mounting brackets 22 of the battery assembly structure 20.

The elastic member 23 can be disposed integrally with the mounting bracket 22, or the elastic member 23 that is separate from the mounting bracket 22 can be mounted on the inner side of the mounting bracket 22.

Unlike in FIG. 2A, the elastic member 23 may be pressed directly against the battery module 1 such that the end of the battery module 1 is restrained in position by the elastic member 23.

In this example, an elastic insertion material 24 formed by an elastic material made of resin, rubber, or the like is inserted between the end of the battery module 1 and the elastic member 23, such that the battery module 1 is easy to incorporate and the restraining force is easy to adjust.

Figure 2B:
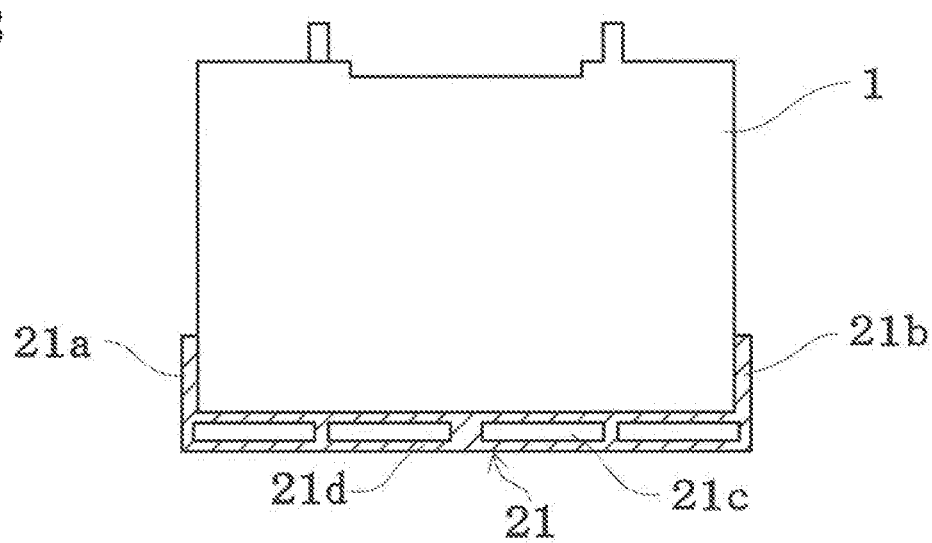
FIG. 2B illustrates a sectional view taken along line B-B of FIG. 1B.
Figure 3:
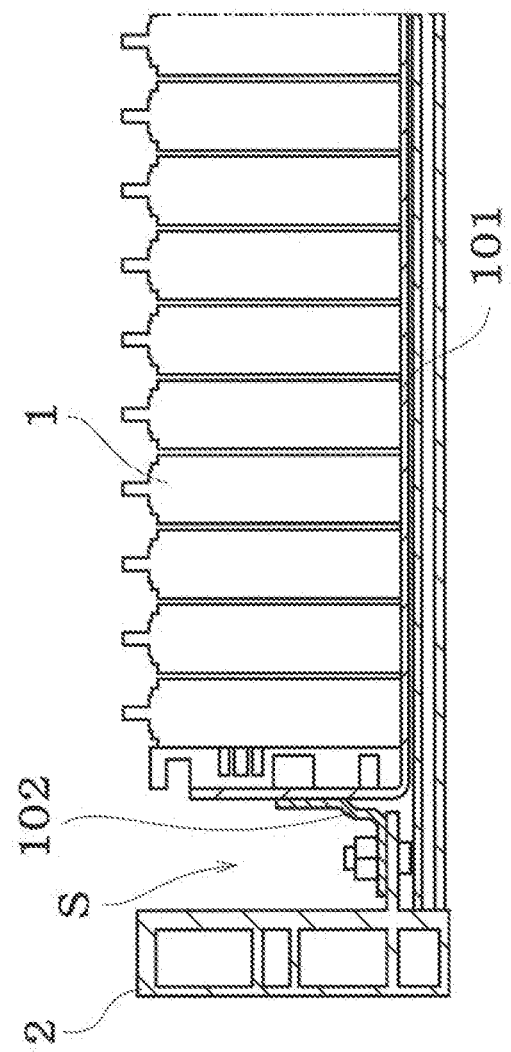
FIG. 3 illustrates an example of a conventional battery module mounting structure.

As illustrated in FIG. 2B that is a sectional view taken along line B-B of FIG. 1B, the holding panel 21 that supports the bottom part of the battery module 1 in the battery module assembly structure 20 has a substantially U-shaped cross-section.

The holding panel 21 includes a bottom panel 21d having hollow portions 21c, and side edge portions 21a, 21b standing upright at both side edges of the bottom 21d along both side edges. A lower part of the battery module 1 (each of single cells 1a) is fitted between the side edge portions 21a, 21b.

Since the bottom 21d has a hollow sectional shape, the holding panel 21 is enhanced in strength and protects the battery module 1 from an impact from a lower side.

Moreover, a refrigerant etc. can be supplied to the hollow portions 21c of the holding panel 21 to thereby regulate the temperature of the battery module 1.

In this example, the pair of side frames 13, 14 also have a hollow sectional shape as illustrated in FIG. 2A, which makes the structure highly effective in protecting the battery module 1 also when an impact is applied from a side as indicated by the arrow.

What is claimed is:

1. A battery assembly structure that is configured to be fixed to side frames of a vehicle provided apart from each other in a width direction of the vehicle, comprising:
   a holding panel that holds a bottom part of a battery module, the holding panel and the battery module extending in a longitudinal direction that is parallel to the width direction of the vehicle, the holding panel having both ends in the longitudinal direction, and the battery module having both end surfaces in the longitudinal direction;
   a pair of mounting brackets coupled to the both ends of the holding panel and having wall portions that stand upright so as to face the both end surfaces of the battery module;
   an elastic member disposed between an inner surface of at least one of the wall portions and at least one end surface of the both end surfaces of the battery module; and
   an elastic insertion material inserted between the elastic member and the at least one end surface of the battery module,
   each of the pair of mounting brackets further including:

a mounting part that is configured to be fixed to a corresponding one of the side frames; and a coupling portion that is fixed to the holding panel;

a gap being provided between an outer surface of the at least one of the wall portions and the corresponding one of the side frames, and each of the wall portions connecting the mounting part with the coupling portion and having a hollow sectional shape with a hollow portion provided between the inner and outer surfaces thereof.

2. The battery assembly structure according to claim 1, wherein the elastic member is held on the inner surface of the at least one of the pair of mounting brackets.

3. The battery assembly structure according to claim 1, wherein the holding panel includes a rectangular bottom panel having both side edges, and side edge portions standing upright at the side edges of the bottom panel along the side edges, and the bottom part of the battery module is held by being sandwiched between the side edge portions.

4. The battery assembly structure according to claim 3, wherein:

the holding panel holds the battery module in which single cells are stacked; and the single cells are each held by being sandwiched between the side edge portions of the holding panel.

5. The battery assembly structure according to claim 1, wherein the holding panel has a hollow sectional shape.

* * * * *